Dec. 3, 1929.  E. A. JOHNSTON ET AL  1,737,850
COTTON PICKER
Filed Nov. 15, 1926   3 Sheets-Sheet 1
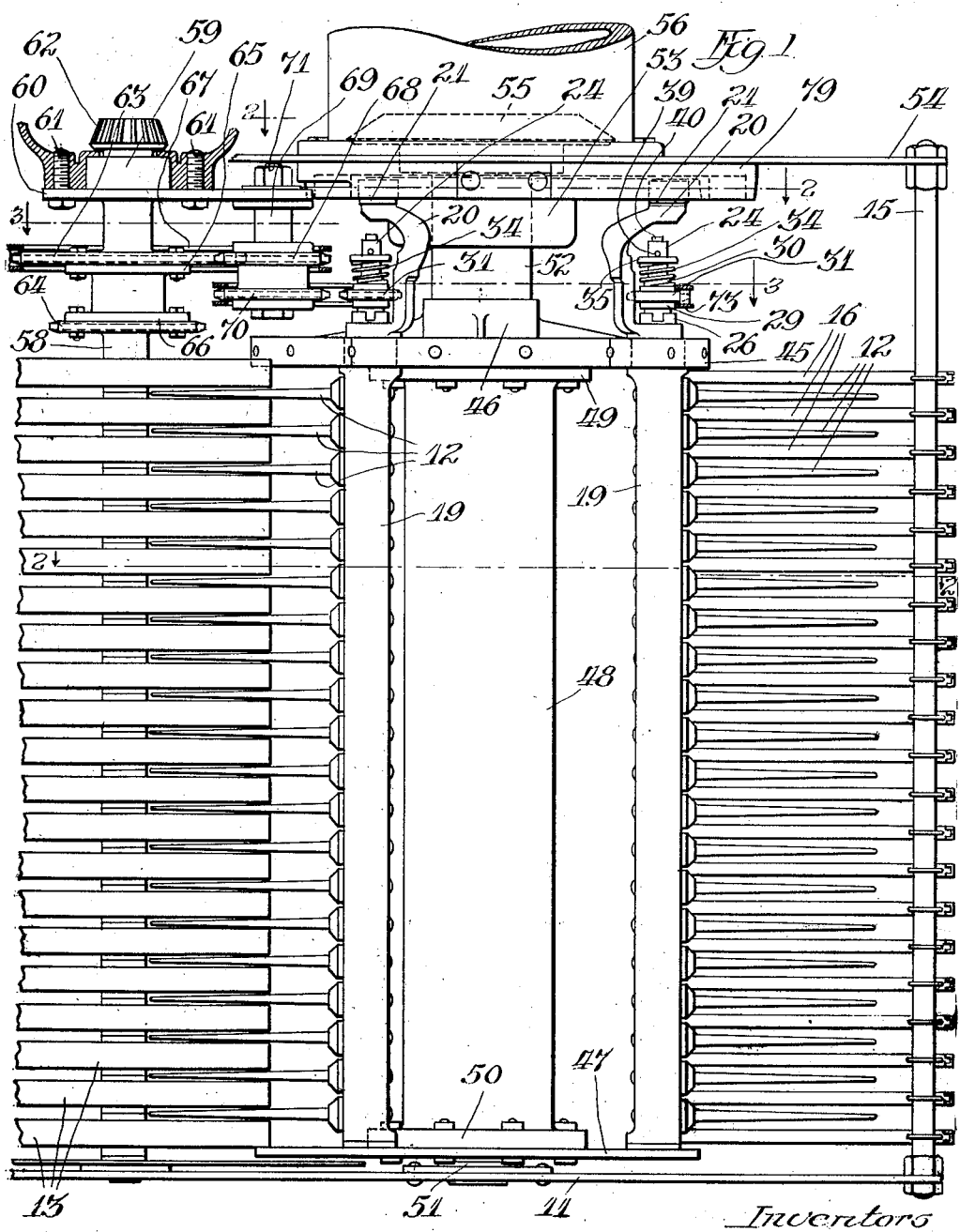
Inventors
Edward A. Johnston
David B. Baker and
Clarence K. Hagen Dec. 3, 1929.  E. A. JOHNSTON ET AL  1,737,850
COTTON PICKER
Filed Nov. 15, 1926   3 Sheets-Sheet 2
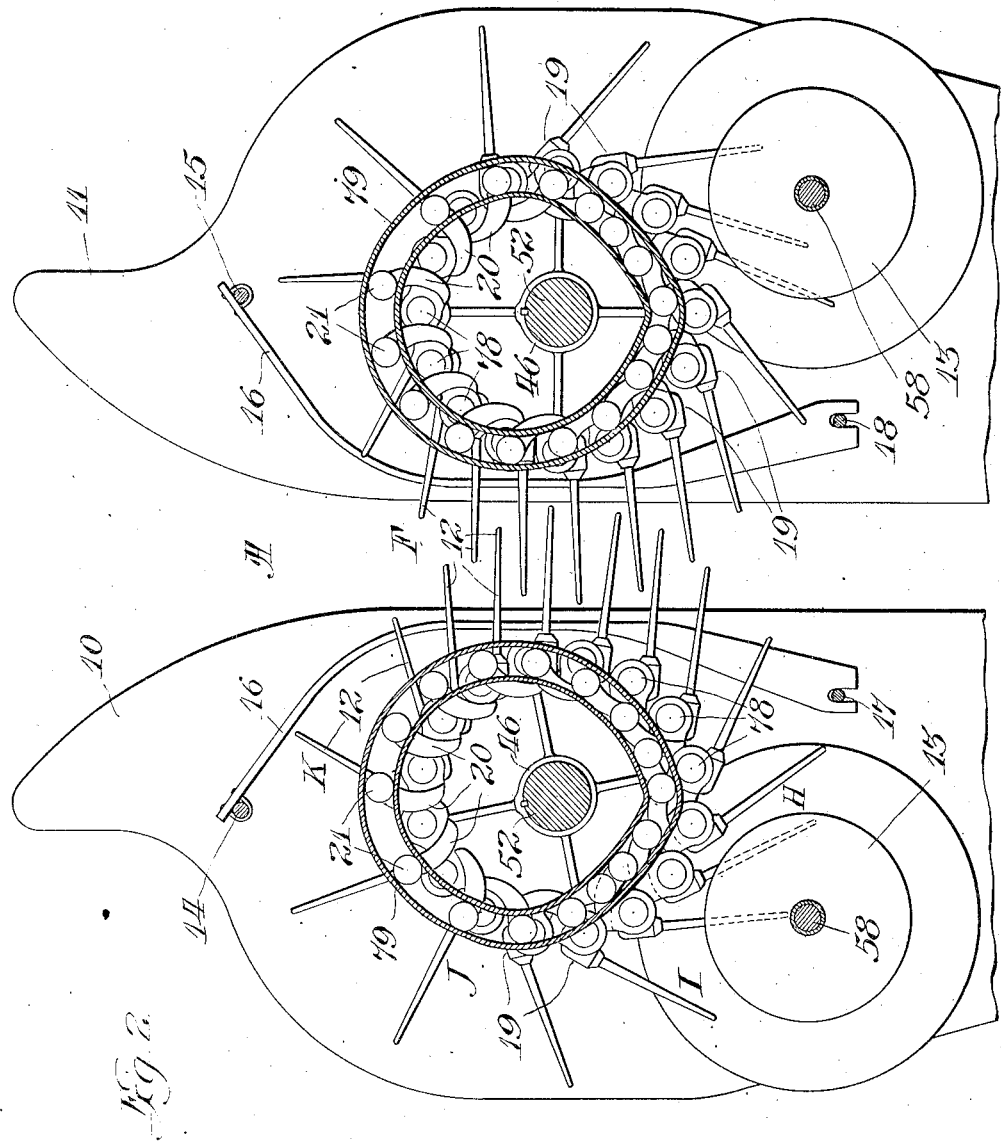

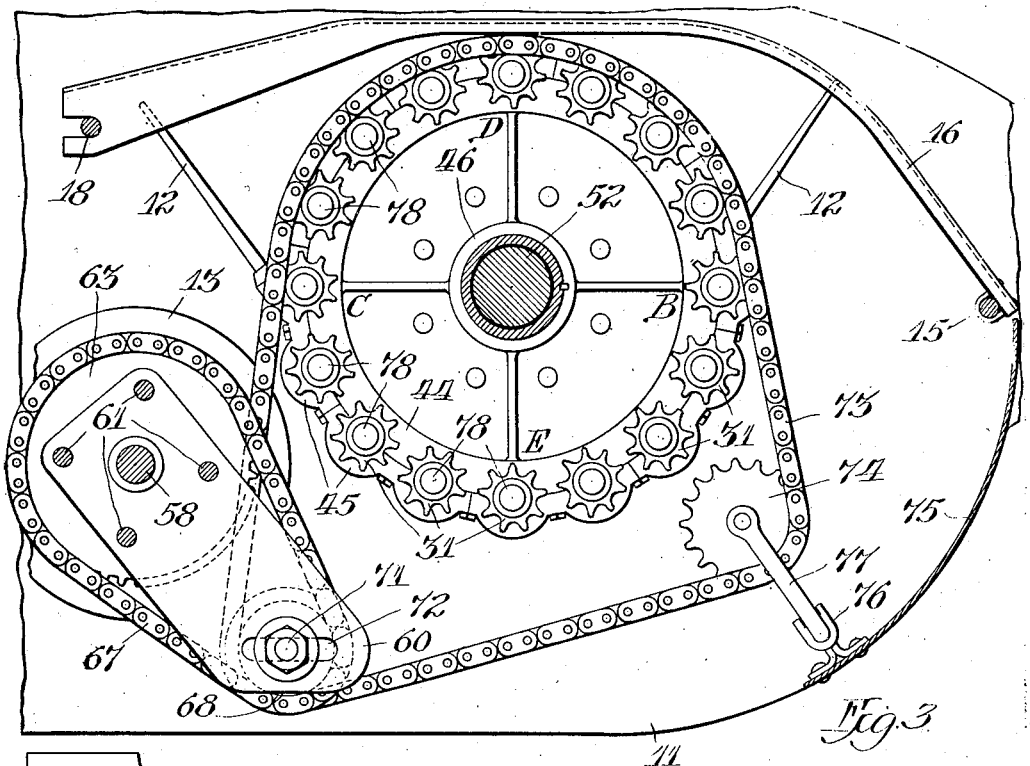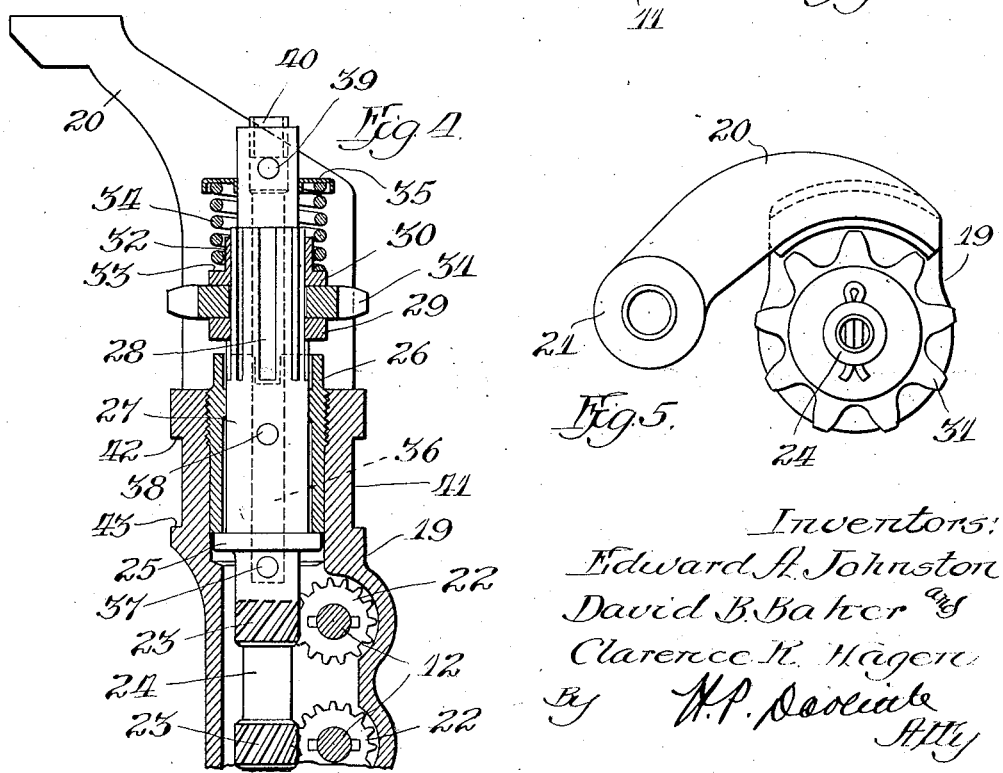

Patented Dec. 3, 1929

1,737,850

UNITED STATES PATENT OFFICE

EDWARD A. JOHNSTON, DAVID B. BAKER, AND CLARENCE R. HAGEN, OF CHICAGO, ILLINOIS, ASSIGNORS TO INTERNATIONAL HARVESTER COMPANY, OF CHICAGO, ILLINOIS, A CORPORATION OF NEW JERSEY

COTTON PICKER

Application filed November 15, 1926. Serial No. 148,556.

This invention relates to cotton pickers of the type employing rotating picker stems which are projected into cotton plants and withdrawn therefrom during the travel of the machine over a cotton field. The mature cotton is wound upon the picker stems while the latter are within the plants and is stripped from the picker stems after the latter are withdrawn from the plants.

More particularly, this invention relates to improvements in the devices for operating the picker stems so that the above mentioned results may be advantageously accomplished.

It is an object of the invention to provide a practical and successful cotton picker having improved mechanism for controlling and operating the picker stems and the members which carry the picker stems.

In a machine of the type disclosed in the accompanying drawings it is necessary that the picker stems be rotated while they are in contact with the cotton plants, and it is desirable that they shall not be rotated while they are out of contact with the plants. As the structures for carrying the picker stems move in their endless courses it is, therefore, important that some means be provided for rotating the picker stems during a certain part of that course only. It has been proposed to use a gear rack operating in conjunction with pinions carried by such structures, but such driving mechanisms have not proven successful. They have involved the necessity of providing devices whereby the pinions will approach the rack in such a manner that none of the gear teeth will be broken. They have also involved the necessity of providing excessive power by reason of increased frictional resistance, and cotton pickers using such driving mechanisms have been found to be incapable of driving the picker stems at a sufficiently high speed of rotation.

It is an object of this invention to provide a mechanism which will overcome the above mentioned defects and constitute an important part of an improved cotton picker.

Referring to the accompanying drawings in which the improved cotton picker is shown,—

Figure 1 is mainly a sectional view illustrating the vertical series of picker stems carried by vertical picker bars, which in turn are mounted upon a carrier for movement in an endless course;

Figure 2 is a diagrammatic plan and sectional view on the line 2—2 of Figure 1, illustrating the throat through which the cotton plants pass, and showing the manner in which the picker stems are projected into and withdrawn from the throat;

Figure 3 is a plan and sectional view on the line 3—3 of Figure 1, illustrating the manner in which the picker stems are operated;

Figure 4 is a vertical sectional view through one of the carriers or casings for the picker stems, showing the power transmitting devices for rotating the picker stems; and Figure 5 is a plan, illustrating the relationship of the sprocket wheel of a picker bar, or picker carrier, to the cam arm which controls the angles of projection of the picker stems.

The illustrative machine provides a throat A through which the cotton plants pass as the machine is drawn along. At its bottom, this throat is formed by opposed platforms 10 and 11 which are divergently curved, as shown in Figure 2 of the drawings for facilitating the proper entrance of the plants within the throat.

As the plants pass through the throat, the rotating picker stems 12 are projected into the plants. These picker stems are preferably so formed that they will effectively wind the mature cotton thereon. As the plants pass on through the throat A, the picker stems are withdrawn so as to pass through the doffers 13 which strip the cotton from the picker stems and throw it out of their path of movement.

Projecting upwardly from the platforms 10 and 11, forward posts 14 and 15 are shown. Extending inwardly and rearwardly and in vertically spaced relation from said posts are plant compressor bars 16 which are held in vertically spaced positions at their rear ends by other posts 17 and 18, also preferably fixed to and extending upwardly from the platforms 10 and 11. There are preferably a large number of these plant compressor bars 16 on each side of the throat A.

The picker stems 12 are so operated and controlled that they will move in the passages between the vertically spaced compressor bars 16, and in the endless course illustrated in Figure 2 of the drawings. The mechanism by which the picker stems 12 are rotated and by which they are caused to move in these endless courses will now be described.

The picker stems are preferably carried by casings or carriers 19 known in the art as "picker bars". In the present instance, these picker bars are formed as hollow integral castings, each having at its upper end a cam arm 20 provided with a cam roller 21, the purpose of which will later appear. The picker stems 12 are journaled on horizontal axes within the picker bars, as illustrated in Figure 4 of the drawings. The picker stems carry pinions 22 which are non-rotatively mounted with respect thereto. The pinions 22 are in driving engagement with gears 23 mounted upon or constructed integral with a driving shaft 24, which is preferably journaled in the picker bar, as is clearly shown in Figure 4. In the structure illustrated in Figure 4, the driving shaft 24 is provided with a thrust flange 25 bearing against an adjustable bushing 26 preferably screw threaded into the picker bar 19. The bearing portion 27 of the shaft 24 is provided with kerfs or grooves 28 for slidably and non-rotatively receiving the friction clutch parts 29 and 30. These clutch parts frictionally engage against a sprocket pinion 31 which is driven so as to impart rotation to the driving shaft 24 and thence to the picker stems 12.

The friction clutch part 30 is formed with an extension 32 and a shoulder 33 for cooperating with an expansion spring 34 which abuts against a fixed cap 35 so as to exert pressure downwardly upon the shoulder 33, thereby normally maintaining the sprocket wheel 31 in operative driving connection with the shaft 24. The cap 35 may be fixed with relation to the shaft 24 by means of a pin or by means of engagement with a fixed part.

For the purpose of lubricating the gearing within the picker bar 19 and the bearings for the shaft 24, the shaft, as shown, is provided with a central axial duct 36 which communicates by means of radial passages 37, 38 and 39 with different parts of the mechanism which need lubrication. Connecting with the upper end of the duct 36 is a member 40 which serves to guide lubricant to the duct and to scrape the lubricant from an oil filled wick, not shown, as a picker bar passes through its endless course.

Each picker bar is formed with a bearing groove 41, the sides 42 and 43 of which form thrust shoulders for engaging the bearing or rim portions 44 and 45 of the head 46 of the picker bar carrier, or drum.

The picker bars are mounted in the carrier or drum so that they will travel in an endless course. In this instance, the carrier comprises an upper head 46 and a lower head 47 having the picker bars journaled near their periphery. The bearing elements 45 are detachable, as indicated in Figure 3 of the drawings, in order to facilitate the insertion of the picker bars in the carrier, and their removal therefrom. The two heads 46 and 47 are connected by means of a column herein shown as a pipe length 48 formed at its ends with radially extending flanges 49 and 50 which are bolted to the upper and lower heads, respectively. The lower end of the carrier has a bearing support 51 on the platform 10. The upper end of the carrier is rotated by means of a shaft 52 which is preferably keyed to the drum, or carrier head 46. This shaft has a bearing 53 supported on the frame work of the machine and fixed with relation to the upper platform 54. A bevel gear 55 is fixed to the shaft 52 for rotating the picker bar carrier. This gear 55 is driven by any suitable arrangement of gearing partially housed by the tubular support 56.

With reference to Figure 1 of the drawings, it may be noticed that several of the picker bars have been omitted for the sake of clearness, the right hand part of the view particularly illustrating the manner in which the picker stems pass between the compressor bars 16. The left picker bar shown in Figure 1 of the drawings is so positioned that its picker stems 12 are passing between the doffers which strip the cotton from the picker stems. The specific construction of these doffers is not part of the present invention and it is believed that no further description of their particular structure is necessary. The doffers are mounted upon vertical shafts 58 journaled at their lower ends on the platforms 10 and 11 and are rotatably mounted at their upper ends by means of bearings 59 supported in the frame-work of the machine. The bearings 59 are shown to be maintained in operative position by means of plates 60 held in positions by machine screws 61.

Each doffer shaft is driven by suitable gearing which includes a bevel gear 62 fixed upon the shaft. Below the platform 54 each doffer shaft 58 fixedly carries sprocket wheels 63 and 64 preferably secured to the shaft by means of the radial flanges 65 and 66. The sprocket wheel 64 forms a part of a driving mechanism which forms no part of this invention and hence is not shown. The sprocket wheel 63 is connected by means of a sprocket chain 67 to a third sprocket wheel 68 journaled upon a counter-shaft 69 and operatively fixed with relation to the fourth sprocket wheel 70.

The counter-shaft 69 is adjustably supported upon the plate 60 by means of an arbor bolt 71 which is slidable in a slot 72 formed in the plate 60. The last mentioned sprocket wheel 70 is located at the same level as the sprocket wheels 31, which are driven by means of a sprocket chain 73. This chain 73 is shown as being in operative engagement with more than one-half of the total number of picker bar sprocket wheels 31, so that, in this instance, a corresponding proportion of picker bars will have their picker stems in rotation. Referring again to Figure 3 of the drawings, the situation may be stated to be that all of the picker stems located along the arc B, D, C are being rotated by the sprocket chain 73, whereas all of the picker stems located in the picker bars along the arc B, E, C are not in operation; that is, they are not being driven. It is while the picker stems are passing through the part of their course indicated by the arc B, E, C that the picker stems are passing through the doffer mechanism and having the cotton stripped therefrom. The endless belt or sprocket chain 73 is held out of engagement with a predetermined number of the picker bar sprocket wheels 31 by means of an idler sprocket 74 pivotally mounted upon the casing 75 by means of a fixed support 76 and a pivot arm 77.

An inspection of the drawings will show that high speed rotation is imparted to the sprocket wheels 31 by the shaft 58. The shaft 58 carries a driving sprocket 63 connected to a driven sprocket 68 of much smaller diameter. Consequently, the counter-shaft carrying the sprockets 68 and 70 will rotate at much higher speed than the shaft 58. This high speed of the counter-shaft is transmitted by means of the endless belt 73 to the sprocket wheels 31 which are directly mounted on the shaft 24, which drives all of the picker stems of a vertical series. Not only is high speed rotation thus imparted to the picker stems, but they may be driven independently of the movement of the carrier for the picker bars. In this case, the gears 62 and 65 may be driven by independent sources of power, or change-speed gearing may be interposed.

In this instance, the drum heads 46 and 47 are circular so that the endless course through which the shafts 24 and sprocket wheels 31 travel is circular, but it is within the purview of this invention that the endless course may be other than circular. For instance, the picker bars with their driving shafts 24 and their sprocket wheels 31 might be carried in an elliptical course by means of endless belts. Figure 2 of the drawings is taken upon a section line of Figure 1 above the section line on which Figure 3 is taken, and also many of the parts indicated in Figure 3 have been eliminated in Figure 2 for the sake of clearness. In order that the illustration may be clear, the axes of the picker bars are indicated at 78 in both figures of the drawings. If a line be passed through these axes as they are shown in Figure 2 of the drawings, it will be seen that those axes are in circular arrangement. These features of the drawings are mentioned on account of the emphasis which Figure 2 places upon the paths traveled by the cam rollers 21. These rollers are in contact with a cam or cam track 79 and are thereby caused to travel in the peculiar heart-shaped paths indicated in Figure 2. These cams or cam tracks 79 are fixed above the picker bar carriers, as indicated in Figure 1 of the drawings. They form downward opening grooves in which the cam rollers 21 travel.

The cams 79 cause the picker stems 12 to take the particular angles of projection indicated in Figure 2 of the drawings. For instance, at the point F in Figure 2, the cams are so curved as to cause the picker stems to be projected substantially transversely of the throat A into the cotton plants, and, as the picker stems approach the doffer disks at the point H in Figure 2, the cams are so curved or formed that the picker stems are substantially in tangential relation to the doffer disks. The first action facilities the projection of the picker stems into the plants without causing material injury to the latter, and the latter action promotes effective doffing by permitting the centrifugal force exerted by the doffers to act on the cotton. As the picker stems pass from the position indicated at I past the position indicated by J and to that position indicated by K in Figure 2, the cam promotes a regular angular change, thereby avoiding excessively accelerated movement and consequent breakage.

What is claimed as new is:

1. In a machine for picking cotton, rotating picker stems adapted to be projected into the plant and withdrawn therefrom during the traverse of the machine along a row of plants, a plurality of independently movable picker bars for carrying the picker stems in separate vertical series, a picker bar carrier, means for operating the carrier to move the picker bars through an endless course, gearing carried by the picker bars for rotating the picker stems, means operating independently of the speed of rotation of the carrier for positively imparting high speed rotation to the gearing, and an idling element for holding said last named means out of contact with a predetermined number of said gearings at all times during the operation of the machine.

2. In a machine for picking cotton, a plurality of series of rotary picker stems, a picker bar for carrying each series of picker stems, a carrier for supporting said picker bars, means for operating the carrier to move the picker bars through an endless course, cam arms carried by said picker bars, a cam track supported on the machine above said picker bars for guiding the cam arms and constantly varying the angles of the picker stems throughout their movement in their endless course, gearing carried by the picker bars for rotating the picker stems, a central vertical shaft carried by each picker bar, a sprocket wheel normally substantially fixed upon said shaft, and a sprocket chain engaging a number of said sprocket wheels for rotating the picker stems at a speed independent of the speed rotation of the carriers.

3. In a machine for picking cotton, a plurality of series of rotary picker stems, a picker bar for carrying each series of picker stems, a carrier supporting the picker bars for independent movement, means for operating said carrier to move the picker bars through an endless course, means for constantly varying the angle of projection of the picker stems throughout the movement of the picker bars in their endless course, a driving shaft rotatively mounted within each picker bar, gearing for operatively connecting each driving shaft with the picker stems carried by the associated picker bar, sprocket wheels carried by the driving shafts, and a sprocket chain continually engaging a predetermined number of the sprocket wheels for rotating the picker stems at a speed independent of the speed of rotation of the carrier.

4. In a machine for picking cotton, a plurality of series of rotary picker stems, a picker bar for carrying each series of picker stems, a revoluble carrier on which the picker bars are mounted, means for operating said carrier to move the picker bars through an endless course, a driving shaft journaled within each picker bar, gearing for rotatively connecting the picker stems of each series with a driving shaft, a sprocket wheel mounted upon each driving shaft for rotating the same, a friction clutch for connecting each sprocket wheel with the driving shaft upon which it is mounted, and a sprocket chain engaging a predetermined number of the sprocket wheels for rotating the picker stems at a speed independent of the speed of rotation of the carrier.

5. In a machine for picking cotton, revoluble picker stems adapted to be projected into cotton plants and withdrawn therefrom during the traverse of the machine, a plurality of independently movable picker bars carrying the picker stems in separate series, a picker bar carrier driving connections for operating the carrier to move the picker bars through an endless course, gearing carried by the picker bars for rotating the picker stems, picker bar driving connections, and means for holding the picker bar driving connections out of driving engagement with a predetermined number of said gearings at all times during the operation of the machine.

In testimony whereof we affix our signatures.

EDWARD A. JOHNSTON.
DAVID B. BAKER.
CLARENCE R. HAGEN.